United States Patent [19]
DeTorre

[11] 3,979,243
[45] Sept. 7, 1976

[54] METHOD OF MAINTAINING EDGE STRENGTH OF A PIECE OF GLASS

[75] Inventor: Robert P. DeTorre, Pittsburgh, Pa.

[73] Assignee: PPG Industries, Inc., Pittsburgh, Pa.

[22] Filed: Mar. 31, 1975

[21] Appl. No.: 565,922

Related U.S. Application Data
[62] Division of Ser. No. 438,096, Jan. 30, 1974.

[52] U.S. Cl. .................................. 156/109; 156/257
[51] Int. Cl.² ..................... C03C 27/06; B26D 3/08
[58] Field of Search ............. 156/99, 101, 102, 107, 156/109, 257, 267, 268; 225/2, 96.5; 83/7, 25, 3; 65/56; 428/43

[56] References Cited
UNITED STATES PATENTS

| | | | |
|---|---|---|---|
| 1,713,854 | 5/1929 | Meyer | 428/43 |
| 1,771,416 | 7/1930 | Owen | 156/101 |
| 2,973,801 | 3/1961 | Ballard | 156/512 |
| 3,532,260 | 10/1970 | Augustin et al. | 225/2 |
| 3,626,795 | 12/1971 | White | 83/7 |
| 3,756,482 | 9/1973 | DeTorre | 225/2 |
| 3,762,985 | 10/1973 | Chaitman | 428/43 |

*Primary Examiner*—Douglas J. Drummond
*Assistant Examiner*—Michael W. Ball
*Attorney, Agent, or Firm*—Donald Carl Lepiane

[57] ABSTRACT

A method of maintaining edge strength of a piece of glass i.e. preventing unintentional damage such as chips and/or scratches to the edges of the piece of glass during handling, processing and/or shipping is disclosed. A sheet of glass having dimensions greater than the desired size of the piece of glass is cut from a glass ribbon. The sheet of glass is pseudosubsurface scored or subsurface scored within the edges to define the piece of glass and to provide trim around the piece of glass which trim protects the edges of the piece of glass against unintentional damage. Thereafter, the sheet of glass is stored or processed, e.g., coating a surface of the sheet of glass with a transparent metal coating. The trim is removed from the sheet of glass at a fabrication station and the piece of glass having edges free of unintentional damage is used in the fabrication of a product e.g., a multiple glazed unit.

13 Claims, 7 Drawing Figures

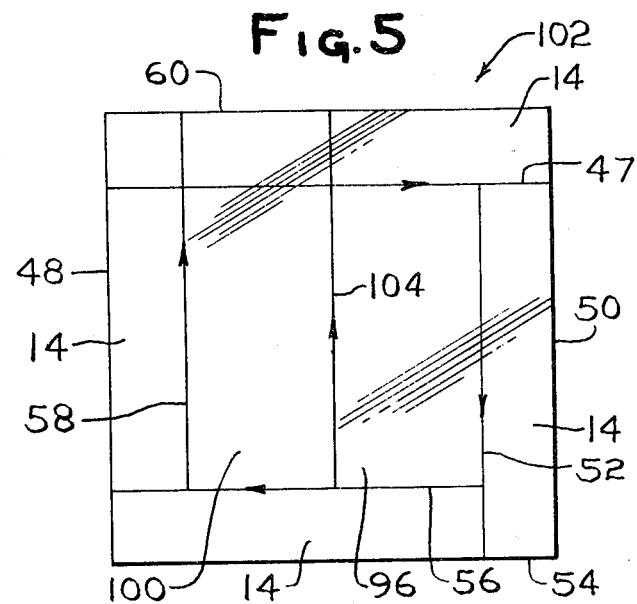
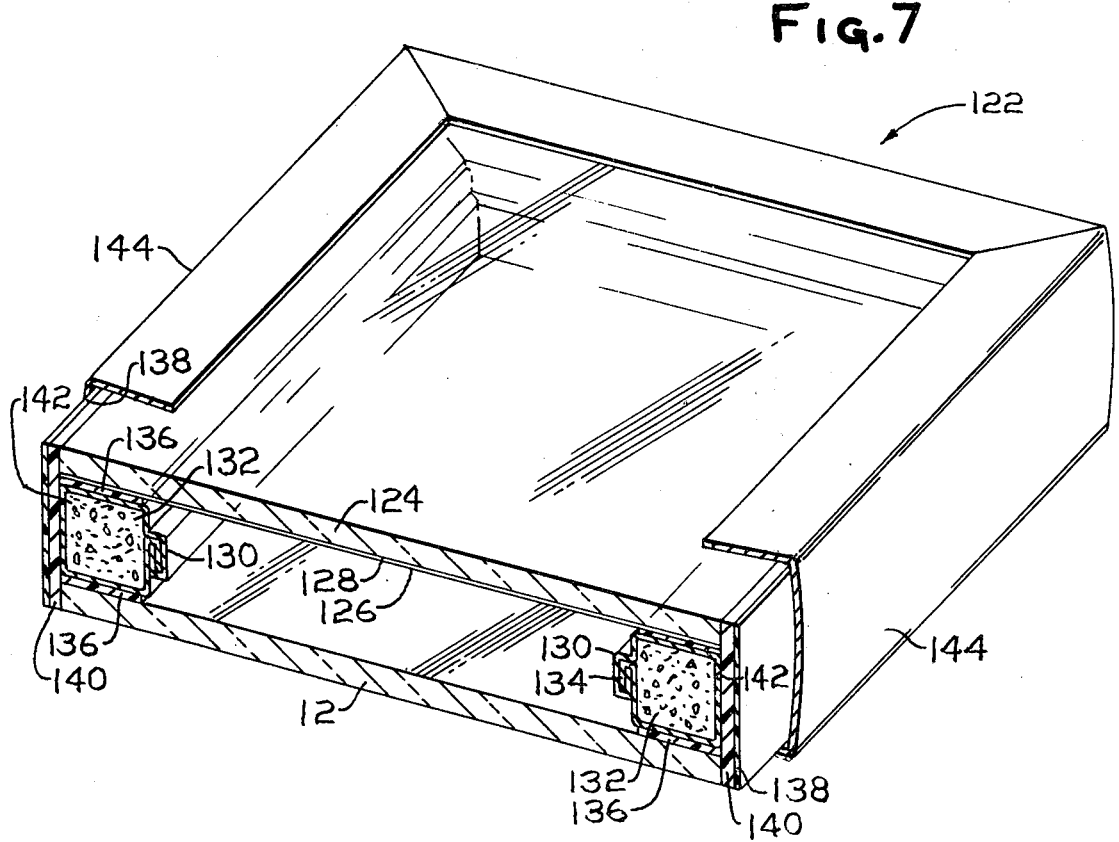

METHOD OF MAINTAINING EDGE STRENGTH OF A PIECE OF GLASS

This is a division, of application Ser. No. 438,096, filed Jan. 30, 1974.

RELATED APPLICATIONS

The teachings of U.S. Pat. Application Ser. No. 417,649 filed on Nov. 20, 1973, in the name of Robert P. DeTorre and entitled "Pseudosubsurface Score" now U.S. Pat. No. 3,865,673; of U.S. Pat. Application Ser. No. 242,511 filed on Apr. 10, 1972, in the names of Fred M. Ernsberger and Charles M. Hollabaugh and entitled "Subsurface cracks" now U.S. Pat. No. 3,865,673; of U.S. Pat. Application Ser. No. 159,746 filed on Jul. 6, 1971, in the name of Helmut Franz and entitled "Angled Crossfire Rinses" now U.S. Pat. No. 3,793,054; of U.S. Pat. Application Ser. No. 257,104 filed on May 26, 1972, in the name of Robert P. DeTorre and entitled "Method of Cutting Glass and Glass Articles Made Thereby" now U.S. Pat. No. 3,795,572; of U.S. Pat. Application Ser. No. 400,112 filed on Sept. 24, 1973, in 6 names of George H. Bowser, Renato J. Mazzoni and Raymond G. Gallagher and entitled "Method of Fabricating A Multiple Glazed Unit"; of U.S. Pat. Nos. 2,684,266, 2,974,377, 3,076,777, 3,756,104 and 3,760,997 may be used in the practice of the present invention and are hereby incorporated by reference.

BACKGROUND OF THE INVENTION

1. Field of the Invention

This invention relates to a method of maintaining edge strength of a piece of glass during handling, processing and/or shipping.

2. Description of the Prior Art

In the manufacture of architectural glass panels or multiple glazed units, it is critical that the edges of the pieces of glass exhibit adequate edge strength e.g., the edge of the piece of glass preferably should have a modulus of rupture (MOR) greater than 2,700 pounds per square inch (psi). This is particularly true for coated glass used as solar-absorbing glass because the difference in temperature between the center of the glass and the edge of the glass can generate tensile stresses at the edge of the glass of up to about 2,700 psi.

In this regard, consider the following. The center of the solar-absorbing glass absorbs heat from the sun and expands. The edges of the glass which are in the mounting frame are not exposed to the sun and therefore have a lower temperature. In certain instances, the temperature of the glass at the center may be as much as 45° to 50°F. greater than at the edges of the glass for certain times of the day, e.g., in the morning. When glass is heated, it expands. Since the glass is hotter at the center than at the edges, the glass expands more at the center than at the edges. It has been found that edges of glass having an MOR of greater than 2,700 psi have a higher probability of withstanding the tensile stresses acting at the edges of the glass than edges of glass that have an MOR of less than 2,700 psi.

The prior art method of manufacturing solar-absorbing glass generally includes the steps of cutting a piece of glass to a desired size, coating the piece of glass with a transparent metal coating and assembling the piece of glass into a unit, e.g., a multiple glazed unit.

The prior art step of cutting normally includes scoring a sheet of glass, removing trim from the sheet of glass and when necessary seaming the edges of the piece of glass to remove scoring damage. As can be appreciated, scoring damage e.g., wing and/or spall, reduces the edge strength of the piece of glass. This is because wing and/or spall are localized areas of high stress and are susceptible to generating a crack when put under tension.

The necessity of the seaming step and amount of seaming required generally depends on the type of scoring employed. For example (1) surface scoring i.e., a substantially perpendicular discontinuity in a sheet of glass that extends or connects to a major surface of the sheet of glass and is bordered at the major surfaces by wing and/or spall requires the seaming step to remove the edge damage caused by wing and/or spall; (2) subsurface cracking or subsurface scoring i.e., an essentially spall- or wing-free discontinuity or fissure, such as an intentionally induced crack or score respectively that is within the thickness of a sheet of glass and extends substantially perpendicular to the major surfaces of the glass but does not extend or connect to either of the major surfaces, requires less seaming, if any, because of the absence of spall and/or wing; and (3) pseudosubsurface score i.e., an intentionally induced discontinuity or fissure in a sheet of glass that extends substantially perpendicular to the major surfaces of the glass but does not appear itself to extend or connect to either major surface of the glass. The pseudosubsurface score is accompanied by a zone of damaged glass which is essentially spall- or wing-free, which zone is disposed between or extends between the tip end of the discontinuity and a major surface of the glass. Pseudosubsurface scoring requires less seaming, if any, than surface scoring.

In each instance, the removal of edge damage induced by scoring increases the edge strength of the piece of glass. However, it has been found, that the edge strength of the piece of glass can have an MOR reduction of up to 1,000 psi after the cutting step and prior to using the piece of glass in fabrication of a unit. This reduction in edge strength generally reduces the edge strength of the piece of glass below an MOR of 2,700 psi thereby making the piece of glass susceptible to cracking.

This reduction of edge strength is attributed to unintentional damage e.g., chips and/or scratches, to the edges of the piece of glass which unintentional damage occurs during handling, processing and/or storing of the piece of glass. The edges of the piece of glass can be damaged for example (1) when the piece of glass is loaded on or removed from a coating apparatus or (2) by chips of glass or abrasive particles on rubber pads which support the glass for shipping or storing. The chips or scratches act as localized areas of stress and the piece of glass cracks by the mechanism previously discussed.

To prevent unintentional damage to the edges of the piece of glass, it is possible to handle the pieces of glass with extreme care. However, this does not prevent accidents from occurring which can cause edge damage to the pieces of glass. Further, increased care in handling tends to increase the cost of the finished unit.

SUMMARY OF THE INVENTION

This invention relates to a method of protecting at least one edge of a piece of frangible material e.g., glass, during handling e.g., coating or washing, to prevent unintentional edge damage e.g., chips and scratches which occur during handling, processing and/or storing to the at least one edge. The method including the steps of providing a sheet of glass having dimensions greater than at least one dimension of the piece, scoring the sheet of glass to provide a score such that the at least one edge of the piece is provided with trim. The score is of the type that does not heal e.g., subsurface score, pseudosubsurface score. The sheet of glass is handled e.g., coated or washed and edge damage normally associated with handling is to the trim and not to the at least one edge of the piece of glass.

Prior to using the piece of glass in manufacturing e.g., fabricating a multiple glazed unit, the trim is removed by applying a bending moment. Any unintentional damage to the glass such as chips and/or scratches which tend to reduce the edge strength are to the edges of the trim and not the at least one edge of the piece of glass. In this manner, the edge strength of the glass is maintained.

Further, this invention relates to an article of manufacture made in accordance to the teaching of the invention.

Further, this invention relates to a method of protecting at least one edge of piece of frangible material e.g., glass, during coating. A sheet of glass is scored to define the piece within the sheet and to provide trim on at least one edge of the piece of glass. During coating, unintentional edge damage is to the trim and not to the piece of glass. After coating the trim is removed.

Further, this invention relates to an improved method of fabricating multiple glazed units. The improvement includes scoring each of two sheets of rigid material e.g., glass, to define a piece of glass within each of the sheets and to provide trim on at least one edge of the piece of glass. The sheets of glass are subsequently stored, coated and/or washed. Any unintentional edge damage during storing, coating and/or washing is to the trim and not to the piece of glass. Prior to using the sheets of glass in fabricating the unit, the trim is removed.

DESCRIPTION OF THE DRAWINGS

FIG. 5 is a similar view as FIG. 2 showing the sheet of glass scored to define two pieces of glass;

FIG. 7 is an isometric view of a multiple glazed unit fabricated in accordance to the teachings of the invention.

DESCRIPTION OF THE INVENTION

Figure 1:
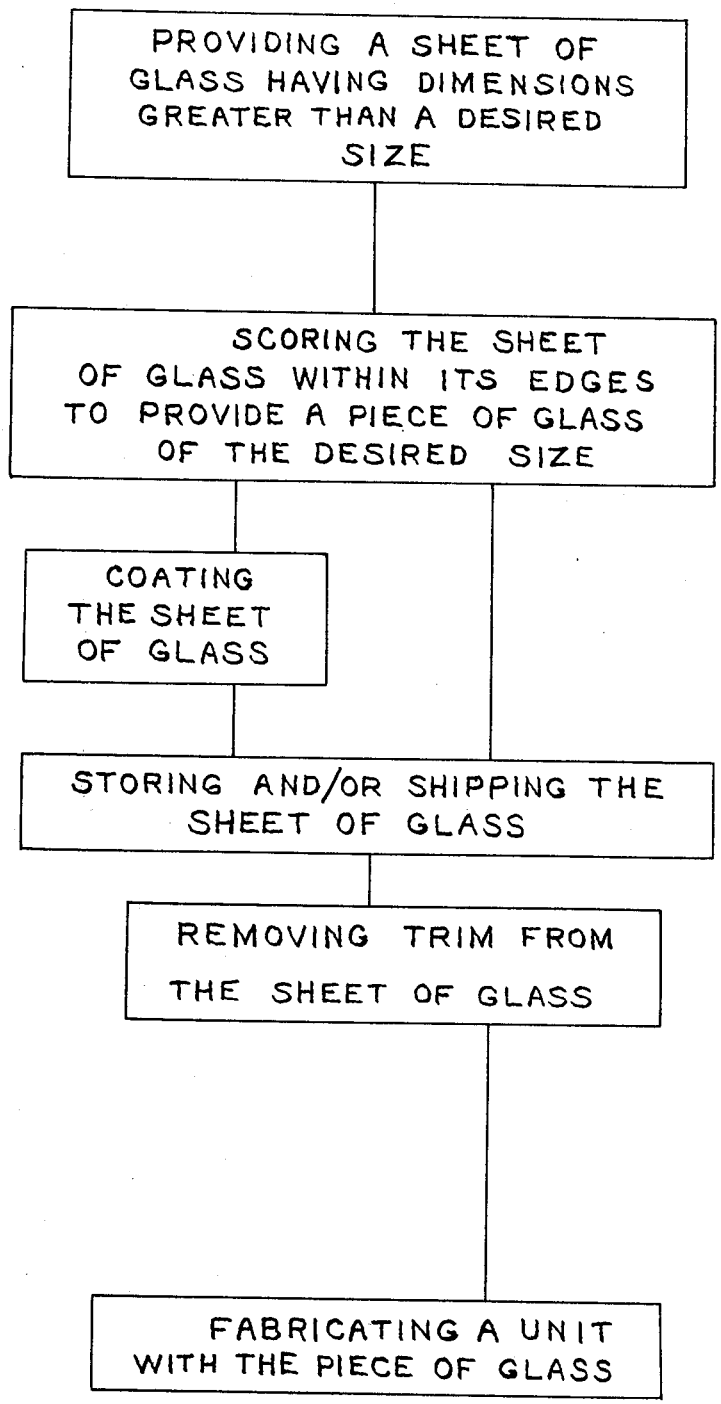
FIG. 1 is a flow diagram illustrating preferred procedural steps of the invention.

With reference to FIG. 1, there is shown a flow diagram of procedural steps that may be taken to practice the invention. As will be appreciated by those skilled in the art, the flow diagram is only illustrative of procedural steps that may be taken in the practice of the invention and therefore, the invention is not limited thereto. Further, the discussion of the invention will be directed to sheets of glass. However, as will become apparent, the invention is not limited thereto and may be practiced on sheets of any frangible material.

As shown in FIG. 1, the first step is to provide a sheet of glass having dimensions greater than a desired size of a piece of glass to be used in fabrication e.g., in the manufacture of a multiple glazed unit. For example, if the piece of glass is to have a dimension of 6 feet × 10 feet, the sheet of glass would preferably have dimensions of between 6-⅓ feet × 10-⅓ feet and 7 feet × 11 feet respectively. This will provide the piece of glass with approximately 2 to 6 inches of trim around its edges.

The sheet of glass, if desired, may be coated with a transparent or opaque coating. As can be appreciated, the invention is not limited to the surface preparation of the sheet of glass.

Figure 2:
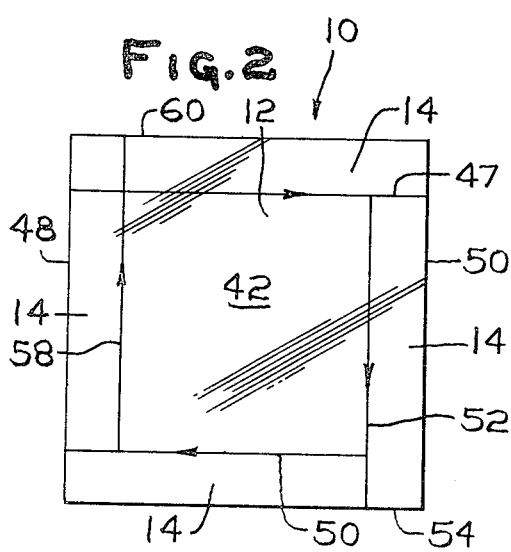
FIG. 2 is a view of a major surface of a sheet of glass scored in accordance to one embodiment of the invention.

The next step of the invention as shown in FIG. 1 is to score the sheet of glass 10 within its edges to define a piece of glass 12 having the desired dimensions to provide the piece of glass 12 with trim 14 (see FIG. 2).

It is recommended that the sheet of glass be scored in such a manner that the score does not heal. In other words, after the passage of time e.g., up to 3 months, the trim can be removed from the sheet of glass at a fabrication station without the necessity of rescoring the sheet of glass. It is believed that a score heals because the stresses produced by the scoring action disappear and the cut is more difficult to open. The advantages of scoring the sheet to define the piece of glass in such a manner that the score does not heal will be discussed in more detail below.

Types of scores that do not heal, but not limited thereto are (1) a pseudosubsurface score as taught in U.S. Pat. Application Ser. No. 417,649 filed on Nov. 20, 1973, in the name of Robert D. DeTorre and entitled "Pseudosubsurface Score" now U.S. Pat. No. 3,865,673; and (2) a subsurface score or crack as taught in U.S. Pat. Application Ser. No. 242,511 filed on Apr. 10, 1972, in the names of Fred M. Ernsberger and Charles M. Hollabaugh and entitled "Subsurface Cracks" now U.S. Pat. No. 3,865,293. A pseudosubsurface score or a subsurface score is preferred for scoring the glass because (1) the score does not heal and (2) normally no seaming of the edges is required after the trim is removed because the edges are essentially free of score damage e.g., wing and/or spall.

For purposes of illustration, the discussion of the invention will be directed to pseudosubsurface scoring. However, as will be appreciated, the invention is not limited thereto.

Figure 3:
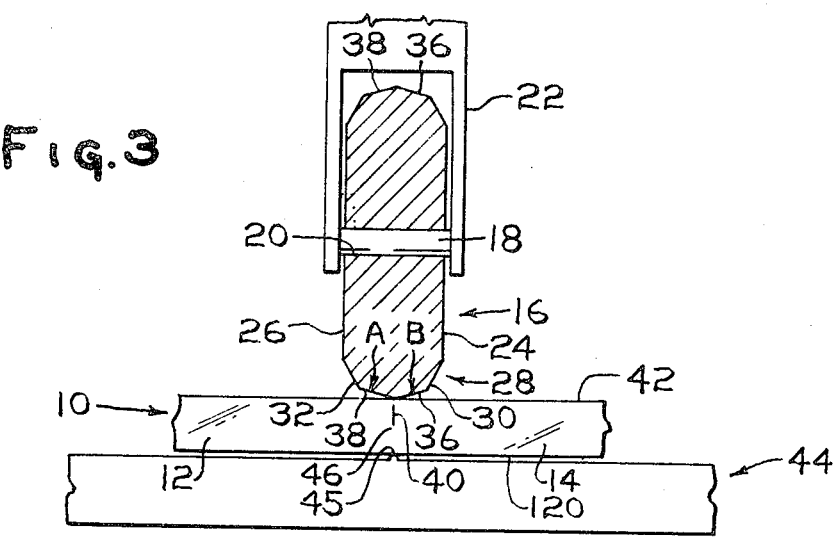
FIG. 3 is an elevation view of a cutting wheel running a pseudosubsurface score in a sheet of glass and having portions removed for purposes of clarity.

With reference to FIG. 3, there is shown a scoring or cutting wheel 16 rotatably mounted on a shaft 18. The shaft 18 passes through a central axle hole 20 of the scoring wheel and is securely mounted at its ends to a fork member 22. One skilled in the art will appreciate that there are many commercially available devices for housing scoring wheels, such as wheel 16 and for supplying a load to the scoring wheel. It is well known, for example, that the necessary scoring force can be applied to a scoring wheel by means of fluid pressure such as air or hydraulic fluid. Further, U.S. Pat. Nos. 3,756,104 and 3,760,997 suggests that a scoring wheel may be actuated by a constant-reluctance motor.

The wheel 16 is preferably made of tungsten carbide or other suitable material having a hardness of about 7 or more on Mohs scale. The wheel 16 has a pair of generally parallel outer surfaces 24 and 26 about scoring surface 28. The scoring surface 28 generally includes sides 30 and 32 which if extended form a base angle of approximately 120°. A cutting angle is formed by sides 36 and 38. To provide a pseudosubsurface score 40 in the sheet of glass 10 which is generally perpendicular to a major surface e.g., surface 42 of the sheet of glass, it is recommended that angles A and B formed by the sides 36 and 38 and the surface 42 of the sheet of glass 10 be equal.

The cutting angle is preferably between approximately 155° and approximately 165°, with approximately 157° to 163° providing optimum results. The diameter of the cutting wheel is at least approximately ½ inch and preferably between approximately ¾ inch and 2 inches. The forces applied to the scoring wheel 16 is between approximately 65 and 600 pounds and preferably between approximately 80 and 300 pounds. The recommended speed of the scoring wheel is between about 60 and 360 inches per minute and preferably between approximately 90 and 250 inches per minute.

Referring to Table I, there is shown the ranges of force for scoring wheels of various diameters each having a scoring angle of 163° the approximate maximum recommended speeds for each wheel and the depths of pseudosubsurface scores induced in glass supported on a flat, hard cutting bed e.g., mounting the sheet of glass on a 1/16 inch line contact under the sheet of glass for support.

TABLE I

Wheel Diameter, Range of Force, Range of Depth of the Pseudosubsurface Score and Maximum Scoring Speed for Scoring Wheels Having a Scoring Angle of 163°

| Wheel Diameter Inches | Range of Force Pounds* | Range of Depth Pseudosubsurface Score Inches | Maximum Scoring Speed Inches/Second |
|---|---|---|---|
| 0.50 | 65–250 | 0.060–0.080 | 1.00 |
| 0.75 | 80–300 | 0.060–0.100 | 1.50 |
| 1.25 | 125–350 | 0.065–0.105 | 3.00 |
| 2.00 | 180–450 | 0.080–0.120 | 4.00 |
| 4.00 | 225–600 | 0.105–0.160 | 6.00 |

*Based on results with 1/16 inch line contact under the glass surface for support With reference to FIG. 3, the sheet of glass 10 is positioned on a rigid support 44 e.g., a flat, hard cutting bed. The support 44 is provided with a line contact 45 e.g., a 1/16 inch high rib.

A series of pseudosubsurface scores is made within the edges of the sheet of glass 10 to define the piece of glass 12 and to provide trim 14 around the piece of glass (see FIG. 2).

In general, the width of the trim 14 is a function of the glass thickness and the distance between the surface engaged by the scoring wheel e.g., surface 42, in FIG. 3 and bottom tip 46 of the pseudosubsurface score 40. As the distance between the surface 42 and the tip 46 of the score 40 increases for sheets of glass of the same thickness, the width of the trim 14 should be decreased. As the width of the trim 14 increases, less bending moment is required to snap the trim from the piece of glass. This is because as the width increases, the weight of the trim increases. Further, as the width of the trim increases, the lever arm i.e., the distance from the score to the adjacent edge of the sheet of glass increases and less force is required to snap the trim. In certain instances, the trim can be snapped during handling and cause injury. Conversely reducing the width of the trim while reducing the distance between surface 42 and the tip 46 of the score 40 (see FIG. 3) for glass sheets having the same thickness to prevent accidental snapping of the trim from the sheet of glass minimizes the advantage of the weight of the trim during the step of removing the trim from the sheet of glass.

With reference to Table II, there is shown preferred minimum pseudosubsurface score depths i.e., the distance between surface 42 and the tip 46 of the score 40, as shown in FIG. 3, for various glass thicknesses and the recommended width of the trim.

TABLE II

Preferred Minimum Depth of Score and Preferred Width of Trim For Pieces of Glass Having Varying Glass Thicknesses

| Glass Thickness Inches | Preferred Minimum Depth of Pseudosubsurface Score Inches | Preferred Width of Trim Inches |
|---|---|---|
| 0.25 | 0.040–.075 | 2 |
| 0.50 | 0.075–0.125 | 2 |
| 0.75 | 0.125–0.180 | 4 |
| 1.00 | 0.180–0.250 | 6 |

Although the invention is not limited thereto, it is recommended to facilitate the start of the pseudosubsurface score that the initial force applied to the scoring wheel be approximately 20 percent greater than the selected scoring force. For example, to initiate the score 40 (see FIG. 3) the pressure should be 20 percent greater and after the score is run for about ⅛ inch, the force is reduced to the selected scoring force. Another recommended method of initiating the pseudosubsurface score 40 is to initially impact the surface 42 of the sheet of glass 10 with a force which is about 20 percent greater than the selected scoring force.

Although it is not completely understood, it has been found that occasionally when a second pseudosubsurface score crosses a first previously made pseudosubsurface score and the trim removed along the second score prior to removing trim along the first score, the trim snapped along the second score deviates from the second score at the cross over between the first and second score. To avoid the problem of trim deviating from the score line, the following is recommended.

A first score may be made from one edge of the sheet to the opposite edge. Subsequent scores may begin from previous scores e.g., a second score starts from the first score and extends to the farthermost edge. Further, it is recommended that the trim be run along the score lines in the sequence in which the scores were made. For example, and with reference to FIG. 2, score 47 extends from edge 48 to edge 50 of the sheet of glass 10. Score 52 extends from the score 47 to the edge 54 of the sheet of glass 10. Score 56 extends from the score 52 to the edge 48 of the sheet of glass 10. Score 58 extends from the score 56 and extends to the edge 60.

Figure 4:
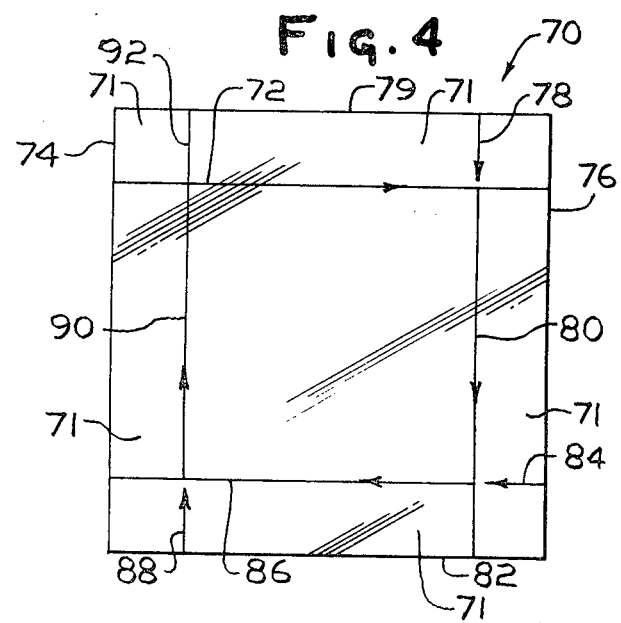
FIG. 4 is a view of a major surface of a sheet of glass scored in accordance with an alternate embodiment of the invention.

The trim 14 is then removed by sequentially running score lines 47, 52, 56 and 58. Another scoring procedure will be discussed. With reference to FIG. 4, a sheet of glass 70 is scored to provide trim 71 by initiating a score 72 at edge 74 and running the score 72 to edge 76 of the sheet of glass 70. A score 78 initiated at edge 79 is run to the score 72. A score 80 is initiated at the score 72 and run to the edge 82 of the sheet of glass 70. A score 84 is initiated at the edge 76 and is run to 70. A score 86 is initiated at the score 80 and run to the edge 74 of the sheet of glass 70. A score 88 is initiated at the edge 82 and run to the score 86. Score 90 is initiated at the score 86 and run to the score 72. Score 92 is initiated at the score 72 and run to the edge 79 of the sheet of glass 70.

The trim 71 of the piece of glass can be removed from the sheet of glass along any selected one of the scores and need not be snapped in accordance with the sequence at which the sheet was scored.

Although two illustrations are presented for providing trim on a sheet of glass, it can be appreciated by those skilled in the art that the invention is not limited thereto.

With reference to FIG. 5, there is shown another embodiment of the invention. More particularly, providing edge protection for a plurality of pieces of glass 96 and 100. In this instance, the sheet of glass has dimensions greater than a plurality of the pieces of glass. A sheet of glass 102 is scored in a similar manner as sheet 10 was scored (see FIG. 2) to provide trim around the edges of the pieces of glass 96 and 100. Thereafter a pseudo-subsurface score 104 is initiated at score 56 and run to the edge 60 to provide the sheet of glass 102 with the two pieces of glass 96 and 100. In this instance, the trim 14 is first removed, as previously discussed, and thereafter the pieces of glass 96 and 100 are separated. Since the score 47 was made prior to score 104, the trim will not deviate from the score 46 when the trim 14 is snapped along the score 47.

As can be appreciated, by providing several pieces of glass within a sheet of glass, the amount of handling is reduced. More particularly, and with reference to FIG. 5, instead of handling 2 discrete sheets of glass e.g., two sheets of glass 10 having the piece of glass 12 (see FIG. 2), it is possible to handle a single sheet of glass e.g., the sheet 102 having two pieces of glass 96 and 100. Further, a savings in material is realized because of the reduction in the amount of trim.

Although the preceding discussion was directed to providing trim around the edges of the piece of glass, it can now be appreciated by those skilled in the art that if only one edge of the piece of glass has unintentional edge damage e.g., chips and/or scratches that occur during handling, processing and/or storing, it is possible to provide trim only on that edge that continually exhibits unintentional edge damage.

Referring back to FIG. 1, the scored sheet of glass may be further processed by coating a transparent metal coating on the surface in any well known manner such as that taught in U.S. Pat. Application Ser. No. 159,746 filed on July 6, 1971, in the name of Helmut Franz and entitled "Angled Crossfire Rinses" now U.S. Pat. No. 3,793,054. In the alternative, if the sheet of glass has a coating already on the surface, it would be directly stored or shipped to a fabrication station. Further, in the alternative, if the sheet of glass is clear and it is not desired to apply a coating to the surface, then the clear sheet of glass would be stored or shipped to a fabrication station.

Unintentional edge damage e.g., chips or scratches, that normally occur during handling, processing and/or shipping which reduces edge strength occurs to the edges of the sheet of glass i.e., to the edges of the trim, and not to the edges of the piece of glass. In this manner, the edge strength of the piece of glass is a function of the cutting method and can be easily controlled.

Figure 6:
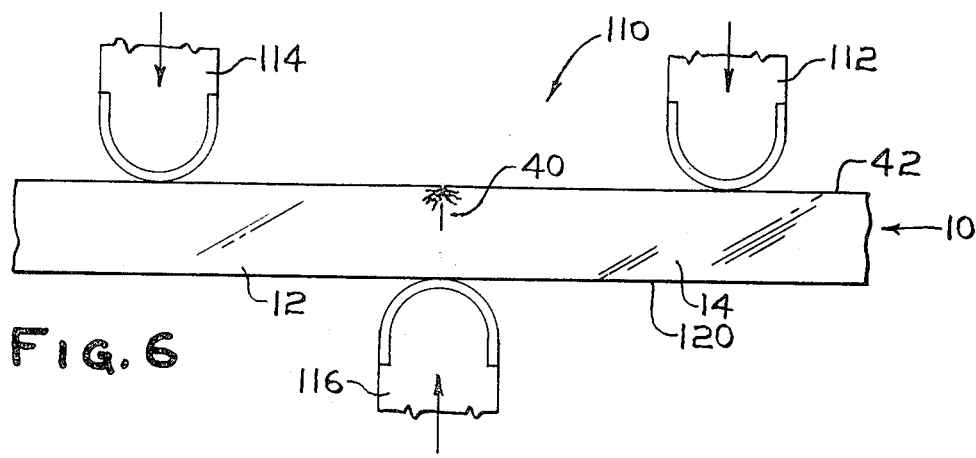
FIG. 6 is an elevation view of a snapping apparatus in position to apply a bending moment about a pseudosubsurface score.

When it is required to use the piece of glass, the trim is removed from the sheet. With reference to FIG. 6, there is shown an elevation view of a snapping apparatus 110 in position to apply a bending moment about the pseudosubsurface deep score 40. The apparatus may consist of two top anvils 112 and 114 and a bottom anvil 116. The top anvils 112 and 114 are positioned against the surface 42 of the sheet of glass about the score 40. The anvil 116 is positioned against surface 120 of the sheet of glass aligned with the score 40. Thereafter, the anvils 112 and 114 are urged downward as the anvil 116 is urged upward as viewed in FIG. 6 to apply a bending moment to remove the trim.

The trim can also be removed by placing the sheet of glass 10 upon a table so that the trim and a portion of the pseudosubsurface score 40 overlaps the table. A bending moment may be applied to the trim which overlaps the table to run a cut along the pseudosubsurface score 40.

It is sometimes difficult, especially with sheets of glass that are relatively long and thick e.g., 0.75 inch thick glass in excess of 10 feet in length, to run a cut in the manner described. Under such circumstances, the tapping and/or heating and/or bending moment procedures disclosed in U.S. Patent Application Ser. No. 257,104 filed on May 26, 1972, in the name of Robert P. DeTorre and entitled "Method of Cutting Glass and Glass Articles Made Thereby" now U.S. Pat. No. 3,795,572 may be employed. Further, the trim may be removed by placing a solid plate approximately ½ inch in width between the glass and the table directly beneath the pseudosubsurface score 10 and applying a bending moment to the trim.

Use of the procedure of Application Ser. No. 257,104 now U.S. Pat. No. 3,795,572 broadly involves applying a tap to the bottom of the score to propagate the score deeper into the piece and/or applying heat along the length of the top of the score to propagate the score deeper into the piece. Thereafter either (1) heat is applied along the bottom of the score to further propagate the score while a bending moment is applied about the score to fracture a remaining thin zone of glass or (2) heat is applied along the bottom of the score to fracture the glass or a bending moment is applied about the score without bottom heating.

Alternatively, use of the narrow plate or member places the top surface of the piece of glass in tension along the score and reduces the energy necessary to run a cut along the entire length of the piece.

Referring back to FIG. 1 after the trim has been removed, a unit e.g., a multiple glazed unit can be fabricated with the piece of glass.

In general, a pseudosubsurface score or subsurface score or fracture provides the piece of glass with pristine edges having an MOR of greater than 2,700 psi and therefore no seaming is required.

As can now be appreciated, by practicing the method of the invention the edge strength of a piece of glass is maintained. This is because any unintentional edge damage e.g., chips and/or scratches, which reduce edge strength occur to the edges of the trim and not to the edge of the piece of glass.

Processing sheets of glass and providing cutting equipment at each of a plurality of fabrication stations is not economically feasible. Processing pieces of glass and thereafter removing edge damage caused by cutting an unintentional edge damage by seaming has two drawbacks; namely (1) the seaming step has to be performed to remove all edge damage and (2) tight tolerances of pieces of glass cannot be easily maintained because the amount of seaming depends on the edge damage.

Although the discussion was directed generally to rectangular or square shaped sheets of glass, it can be appreciated that the invention is not limited thereto. More particularly, the method of this invention may be used to prevent unintentional edge damage to windshield blanks.

DETAILED DESCRIPTION OF THE INVENTION

The method of the invention will now be described to fabricate a multiple glazed unit 122 shown in FIG. 7. The unit 122 includes a piece of glass 124 coated with a transparent metal coating 126 on surface 128 of a piece of glass and a clear piece of glass 12. The pieces of glass used to fabricate the multiple glazed unit are required to have dimensions of 6 feet × 10 feet and a thickness of approximately ¼ inch.

Two sheets of glass 10 are provided each approximately 6-⅛ inches × × 10-⅛ inches. With reference to FIG. 3, a scoring wheel 16 having a diameter of ¾ inch and a cutting angle of 163° will be used to pseudosubsurface score the sheets of glass. A force of 300 pounds is applied to the wheel 16 to provide a pseudosubsurface score 40 between major surfaces 42 and 120 of the sheets of glass.

With reference to FIGS. 2 and 3, the sheet of glass 10 is positioned on a flat hard cutting bed 44 having a 1/16 inch line contact 45. The surface 120 engages the line contact 45 about 2 inches from edge 60 of the sheet of glass. The wheel 16 is positioned at edge 48, 2 inches from the edge 60 and above the line contact 45. The force acting on the wheel is 360 pounds to initiate the score 47. The wheel is moved about ⅛ inches toward the edge 50 of the sheet of glass, in any conventional manner as the force is dropped to 300 pounds. The score 47 is run to the edge 50 under a force of 300 pounds. The wheel 16 is then positioned at the score 46 spaced 2 inches from the edge 50 and above line contact 45. A score 52 is run from the score 47 toward the edge 54 of the sheet of glass 10 in a similar manner as score 47 was run. The wheel 16 is then placed at the score 52 spaced 2 inches from the edge 54 of the sheet of glass 10 and above the line contact 45. A score 56 is run from the score 52 toward edge 48 of the sheet of glass in a similar manner as the score 47 was run. The wheel 16 is then placed at the score 56 spaced 2 inches from the edge 48 and above the line contact 45. A score 58 is run from the score 56 toward the edge 60 of the sheet of glass in a similar manner as the score 47 was run.

The above scoring procedure is repeated on the second sheet of glass to provide two sheets of glass each having 2 inches of trim about a piece of glass 12 having dimensions of 6 feet × 10 feet.

Thereafter, a coating is applied to one surface of a sheet of glass in a manner disclosed in the above-mentioned U.S. Pat. Application Ser. No. 159,746 now U.S. Pat. No. 3,793,054 to provide a sheet of glass having the piece of glass 124 with the coating 126 on the surface 128 (see FIG. 7). During the coating of the surface 128 any unintentional edge damage occurs to the edges of the trim and not to the edges of the piece of glass 124. In this manner, the edge strength of the piece of glass 124 is maintained.

The sheet of glass having a coated surface and the other sheet of glass are shipped to a fabrication station designated for fabricating multiple glazed units. During the handling and/or shipping of the sheets of glass, any unintentional edge damage is to the edges of the trim and not to the edges of the pieces of glass thereby maintaining the edge strength of the pieces of glass.

At the fabrication station the sheets of glass are washed in any conventional manner to clean the surfaces. During the washing, unintentional edge damage occurs to the edges of the trim and not to the edges of the pieces of glass. Thereafter, the trim is mechanically removed from the sheets of glass by applying a bending moment to provide two pieces of glass 10 and 126 having dimensions of 6 feet × 10 feet and having edges free of unintentional edge damage.

More particularly and with reference to FIGS. 2 and 6, a pair of anvils 112 and 114 are positioned in from the edge 48 of the sheet of glass 10 about the score 47 and against the surface 42. An anvil 116 is positioned against surface 120 of the sheet of glass 10 aligned with the score 46.

With reference to FIG. 6, the anvils 112 and 114 are moved downward as the anvil 116 is moved upward as viewed in FIG. 6 under a force of 16 inches-pounds to apply a bending moment to the trim 14. To facilitate the propagation of the score 47 to the major surfaces 42 and 120 the edge 48 at the score 47 may be tapped with a rigid member before applying the bending moment.

In a similar manner, and in sequence, scores 52 and 56 and 58 are propagated to major surfaces of the sheet of glass to remove the trim.

Thereafter, the pieces of glass are used in the fabrication of a multiple glazed unit fabricated in any conventional manner.

For example, and with reference to FIG. 7, there is shown the multiple glazed unit 122 having the coated piece of glass 124 and the clear piece of glass 12 arranged in parallel relationship. The glass sheets are separated at their marginal edges by a continuous metal spacer element 130 such as disclosed in U.S. Pat. No. 2,684,266. The spacer element includes a generally rectangular cross-sectional tubular portion that is filled with a desiccant 132. An example of a suitable desiccant is granular or powdered silica gel. Communication between the air space between the pieces of glass 12 and 124 and the desiccant 132 is provided through a plurality of channels or passages 134 in the spacer element 130. The spacer element 130 extends completely around the unit 122 and between the marginal edges of the glass sheets.

The spacer element 130 is adhered to the glass sheets 12 and 126 at their inner faces by way of a thin continuous film of an adhesive, moisture-resistant mastic composition 136 such as disclosed in U.S. Pat. Nos. 2,974,377 and 3,076,777 to form a primary moisture resistant seal. The primary seal may be formed in any conventional manner such as that taught in U.S. Pat. Application Ser. No. 400,112 filed on Sept. 24, 1973, in the names of George H. Bowser, Renato J. Mazzoni and Raymond G. Gallagher and entitled "Method of Fabricating a Multiple Glazed Unit."

In addition, a resilient, moisture-resistant strip 138 with a layer of mastic 140 adhered thereto, such as disclosed in U.S. Pat. No. 2,974,377 is bonded to the peripheral edge or flat side 142 of the spacer element 130 and the peripheral edges of the pieces of glass in any conventional manner. Strip 138 and mastic 140 extend completely around the perimeter of the unit.

A channel member 144 of essentially U-shaped cross-section also extends completely around the perimeter of the unit to protect the edges. The channel member 144 generally includes several sections of channeling that are joined or butted together at their ends.

As can be appreciated, by practicing the method of this invention, any unintentional edge damage that occurs during the coating, shipping, storing and/or handling will be to the edges of the trim and not to the pieces of glass. By providing that the unintentional edge damage occurs to the trim and not to the pieces of glass, the MOR of the edges of the piece of glass is a function of the method of cutting and is not reduced by chipping and/or scratching normally occurring to the edges during intermediate processes or handling.

What is claimed is:

1. In a method of fabricating a multiple glazed unit wherein the method includes the steps of providing at least two pieces of glass each having generally similar predetermined size and shape; providing a spacer between the two pieces to provide a compartment therebetween; and hermetically sealing the edges of the glass pieces, the improvement comprising the steps of:
   providing at least one sheet of glass having at least one peripheral dimension greater than a peripheral dimension of a one of the pieces and one major surface having a surface area greater than the surface area of one major surface of the one of the pieces;
   scoring the at least one sheet at a first position with a score line that is essentially free of wing or spall to provide a glass piece having trim;
   moving the glass piece having trim to a second position;
   supporting the glass piece having trim during movement to and/or at the second position by way of the trim to protect the peripheral edge portions of the glas piece from edge contacting forces by the trim;
   running the score line on the piece having trim to remove the trim to provide at least one glass piece having the generally similar predetermined size and shape; and
   practicing the hermetically sealing step.

2. The improved method as set forth in claim 1 further including the step of the coating at least one surface of at least one sheet prior to said step of running the score line.

3. The improved method as set forth in claim 1 wherein the score is a discontinuity that is within the thickness of the sheet and does not extend to the surfaces of the sheet.

4. The improved method as set forth in claim 1 wherein the at least one glass sheet has dimensions greater than the predetermined dimensions of at least one of the pieces and said step of scoring includes scoring the at least one sheet within its edges to define the piece and to leave trim completely around the at least one piece.

5. The improved method as set forth in claim 1 wherein said providing step includes providing two glass sheets each having at least one peripheral dimension greater than a peripheral dimension of a one of the pieces and one major surface having a surface area greater than the surface area of one major surface of the one of the pieces.

6. The improved method as set forth in claim 1 further including the steps of:
   providing a protective material to at least the peripheral edges of the multiple glazed unit to prevent damage to the peripheral edges of the glazed unit.

7. The improved method as set forth in claim 1 wherein said supporting step includes the step of positioning the sheet of glass in a generally vertical position with the peripheral edge portions of the trim in surface engagement with a base.

8. The improved method as set forth in claim 7 wherein said supporting step further includes the step of shipping the sheet of glass.

9. The improved method as set forth in claim 7 wherein said supporting step further includes the step of storing the sheet of glass.

10. The improved as set forth in claim 1 wherein at least one of the at least one sheet has four sides and said step of scoring includes:
    scoring the sheet of glass from a first side toward a second side opposite to the first side to provide a first score line on the sheet of glass between the first and second side of the sheet of glass;
    scoring the sheet of glass from the first score line toward a third side to provide a second score line between the first score line and a third side;
    scoring the sheet of glass from the second score line to the first side to provide a third score line between the second score line and the first side; and
    scoring the sheet of glass from the third score line to a fourth side to provide a fourth score line between the third score line and fourth side wherein the piece of glass is defined by the first, second, third and fourth score lines and the piece of glass has trim on each side.

11. The improved method as set forth in claim 10 further including the step of coating at least one surface of the sheet of glass having trim.

12. The improved method as set forth in claim 10 wherein said step of running the score lines to remove the trim includes:
    sequentially running the first, second, third and fourth score lines to remove the trim from the sheet of glass.

13. The improved method as set forth in claim 10 further including the step of:
    scoring the sheet between at least one pair of opposed score lines to define two pieces of glass within the sheet; and
    separating the two pieces after said step of removing the trim.

* * * * *

UNITED STATES PATENT AND TRADEMARK OFFICE
CERTIFICATE OF CORRECTION

PATENT NO. : 3,979,243
DATED : September 7, 1976
INVENTOR(S) : Robert P. DeTorre It is certified that error appears in the above-identified patent and that said Letters Patent are hereby corrected as shown below:

Claim 1, line 22, delete "glas" and insert --glass--.

Claim 2, line 2, delete "the" after --including the step of-- and insert --the-- after "at least one surface of" at line 3.

Signed and Sealed this

Twenty-third Day of November 1976

[SEAL]

Attest:

RUTH C. MASON
Attesting Officer

C. MARSHALL DANN
Commissioner of Patents and Trademarks